United States Patent

[11] 3,573,801

[72] Inventors Richard L. Cohen
Old Bridge;
Frederick R. Sylvander, Rutherford, N.J.
[21] Appl. No. 698,929
[22] Filed Jan. 18, 1968
[45] Patented Apr. 6, 1971
[73] Assignee The Bendix Corporation
Teterboro, N.J.

[54] SYNCHRO TO DIGITAL CONVERTER
14 Claims, 3 Drawing Figs.

[52] U.S. Cl. 340/347
[51] Int. Cl. G08c 9/04
[50] Field of Search 340/347 (AD)

[56] References Cited

UNITED STATES PATENTS 3,440,644 4/1969 Burgis et al. 340/347

*Primary Examiner*—Rodney D. Bennett, Jr.
*Assistant Examiner*—Daniel C. Kaufman
*Attorneys*—James M. Nickels and Plante, Hartz, Smith & Thompson ABSTRACT: A synchro to digital converter which utilizes the null position to actuate a series of bistable devices to provide the digital count together with phase detectors to resolve ambiguities.

INVENTORS
RICHARD L. COHEN
FREDERICK B. SYLVANDER
BY [signature]
ATTORNEY

INVENTORS
RICHARD L. COHEN
FREDERICK B SYLVANDER
BY
ATTORNEY

SYNCHRO TO DIGITAL CONVERTER

BACKGROUND OF THE INVENTION

1. Field of the Invention

The invention relates to the field of analogue to digital converters and more specifically to means for converting a shaft angle into digital 5-4-2-1 code where the shaft is coupled to two or more synchro transmitters.

2. Description of the Prior Art

Previously to convert an analogue shaft position to digital form required the use of an additional synchro or commutator type A/D converter coupled to the shaft in such a ratio that one revolution of the device covers the entire range. Such a device requires greater accuracy in the synchro. Also very complex means are required to make the conversion. Some applications require extreme accuracy of excitation frequency and waveform. The present invention provides a relatively simple method of conversion to a 5-4-2-1 code utilizing the synchros and geneva mechanism already present.

SUMMARY OF THE INVENTION

The present invention is directed to means for converting a shaft angle into digital 5-4-2-1 code where a shaft is coupled to two or more synchro transmitters. One of the synchros is directly coupled to the previous one by a geneva mechanism. Means are provided to indicate null positions which actuate a series of bistable devices to provide the digital count. Further phase detectors are utilized to resolve ambiguities.

DESCRIPTION OF THE PREFERRED EMBODIMENTS

Figure 1:
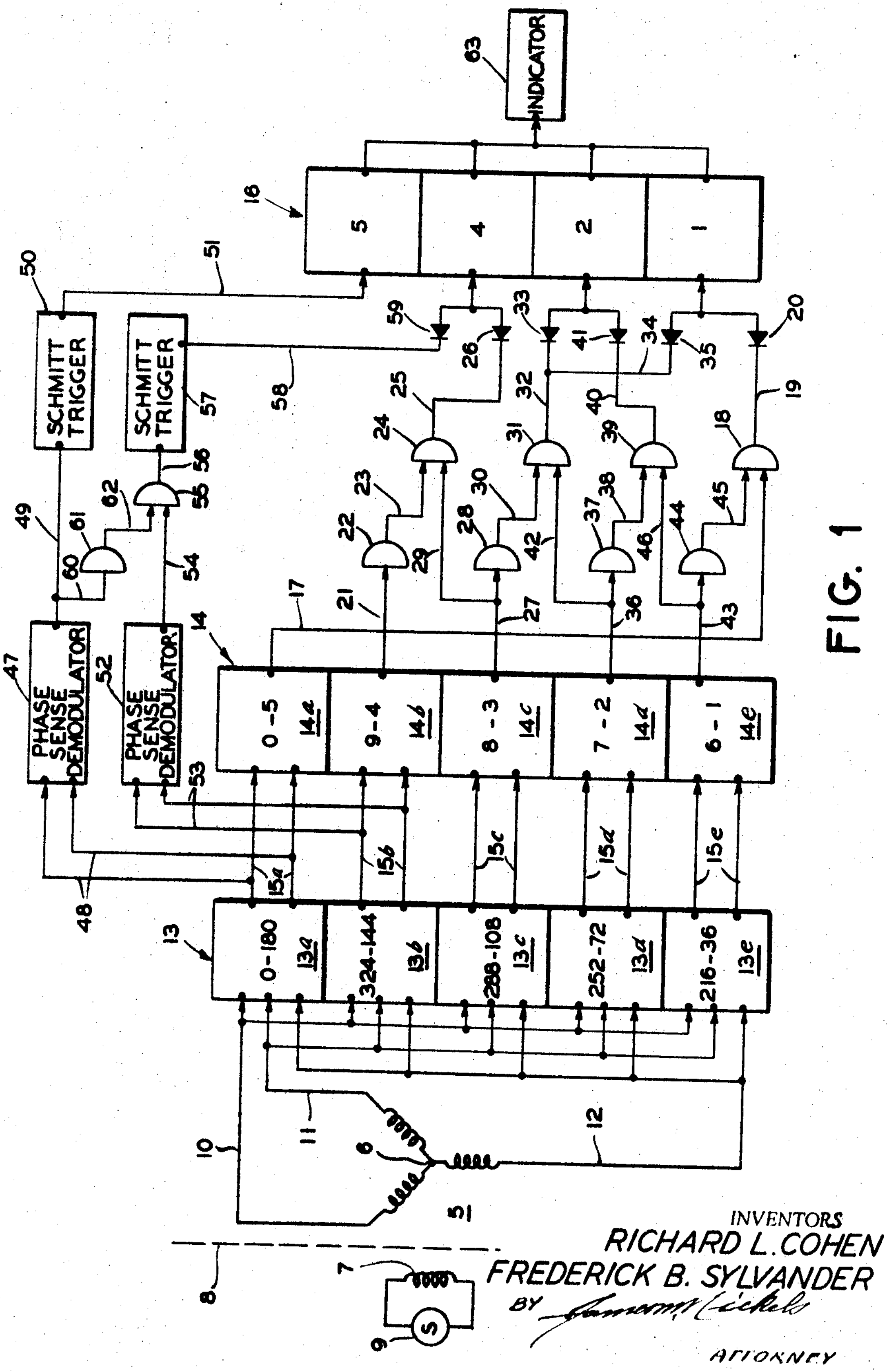
FIG. 1 is a diagrammatical representation of a synchro to digital converter.

Referring not to FIG. 1 of the drawing, a synchro 5 has a fixed three phase stator winding 6 and a rotor winding 7. The rotor winding 7 is directly coupled for rotation by a shaft 8 and is connected across a suitable AC supply 9. For the purposes of illustration, the rotor winding 7 is considered to be turned in continuous increments of 36° or 10 increments. The output from the stator winding 6 of the synchro 5 is connected by conductors 10, 11 and 12 to a plurality of resistive networks indicated generally by the numeral 13.

There are half as many of the resistive networks 13 as there are increments of a complete shaft revolution as opposite increments will have the same null points but of opposite phase. For example, resistive network 13*a* will have a null point for 0° and 180°, network 13*b* will have a null point for 144° and 234°, 13*c* for 108° and 288°, 13*d* for 72° and 252° and 13*e* for 36° and 216°. The outputs from the networks 13 are connected to a similar number of circuits 14 which will produce binary "on" or "off" signal outputs, one of which will always indicate a proximity condition to one digit or its 180° opposite digit. The circuits 14 may have single-ended or differential inputs as appropriate to the type of network utilized which are well known in the art.

Specifically, the network 13*a* is connected by conductors 15*a* to circuit 14*a* which will indicate 0 to 5. In like manner the networks 13*b*, 13*c*, 13*d* and 13*e* are connected to circuits 14*b*, 14*c* and 14*e* by respective conductors 15*b*, 15*c*, 15*d* and 15*e*. The circuits 14*b*, 14*c*, 14*d* and 14*e* indicate 9–4, 8–3, 7–2 and 6–1 respectively. The circuits 14 are connected to an output register 16 which is of the 1, 2, 4, 5 type as follows. The 14*a* circuit is connected by conductor 17 to one input of a logic 18. The output of the logic 18 is connected by conductor 19 and diode 20 to the 1 flip-flop of the register 16. The circuit 14*b* is connected by conductor 21 to the input of logic 22. The output of the logic 22 is connected by conductor 23 to the input of logic 24. The output from the logic 24 is connected by conductor 25 and diode 26 to the 4 flip-flop of the register 16. The circuit 14*c* is connected by conductor 27 to the input of logic 28 and also connected by conductor 29 to the input of the logic 24. The output of the logic 28 is connected by conductor 30 to the input of logic 31, the output of which is connected by conductor 32 and diode 33 to the 2 flip-flop of the register 16 and also to the flip-flop 1 of the register 16 by conductor 34 and diode 35. The circuit 14*d* is connected by conductor 36 to the input of logic 37, the output of which is connected by conductor 38 to the input of logic 39. The logic 39 is connected by conductor 40 and diode 44 to the 2 flip-flop of the register 16. The circuit 14*d* is also connected by conductor 42 to the logic 31. The circuit 14*e* is connected by conductor 43 to the input of logic 44 which has its output connected to the logic 18 by conductor 45. Also the circuit 14*d* is connected by conductor 46 to the logic 39.

A phase sense demodulator 47 has its input connected by conductors 48 to the conductors 15*a*. The output of the demodulator 47 is connected by conductor 49 to a level sensitive binary circuit 50, for example a Schmitt Trigger. The Schmitt Trigger 50 has its output connected to the 5 flip-flop of the register 16 by conductor 51. A second phase sense demodulator 52 is connected by conductors 53 to the conductors 15*b* and has its output connected by conductor 54 to the input of logic 55. The output from the logic 55 is connected by conductor 56 to a level sensitive binary circuit 57, for example a Schmitt Trigger. The output from the Schmitt Trigger 57 is connected by conductor 48 and diode 59 to the 4 flip-flop of the register 16. The demodulator 47 is also connected by conductor 60, logic 61 and conductor 62 to the logic 55.

In the operation, the thresholds on the circuits 14 are set to a value of between 50 percent to 100 percent of the voltage corresponding to one digit displacement. Thus, either one or two of the proximity outputs will be present for any open position. Standard logic is used so that in the case of two adjacent "on" signals only the lower (or higher) one is used. For example, 3.5 would show proximity to both 3 and 4, hence would be encoded as 7 without the logic. With the logic it will be encoded as a 3. Normally with a threshold of 50 percent, angles between 4.6 and 5.0 would be recognized as 0 or 5. To overcome this difficulty, the phase sense demodulator 52 together with logics 61 and 55 will encode any angle between 4.0 and 5.0 as a 4. The phase sense demodulator 47 combined with the Schmitt circuit 50 will produce a signal which will indicate whether the synchro is higher than the digit 5 and is entered into the 5 flip-flop thus enabling the encoding of the digits 6, 7, 8 and 9. The output of the register 16 may be passed on to a suitable indicator or display 63.

Figures 2, 3:
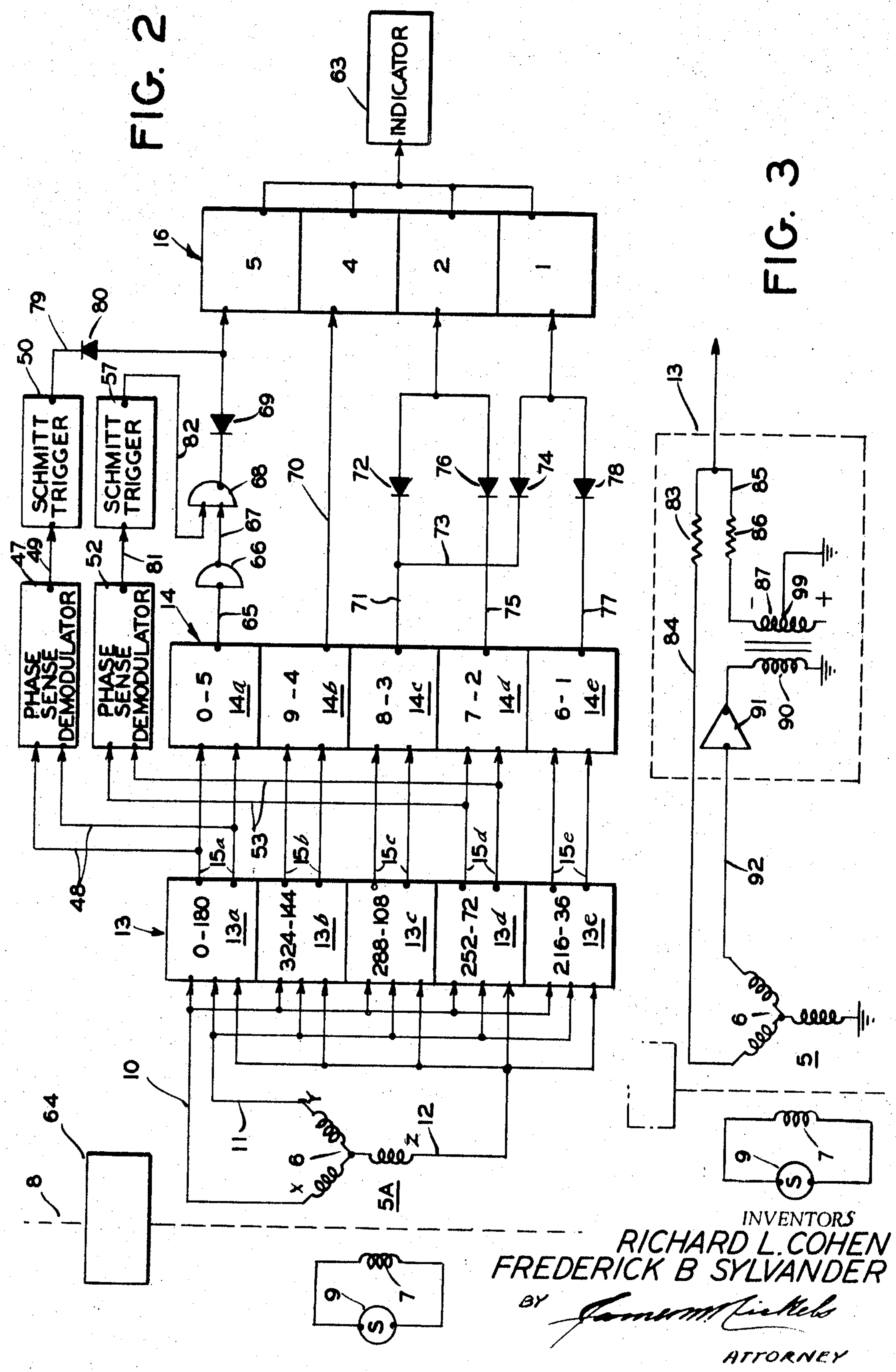
FIG. 2 is a diagrammatical representation of another embodiment of a synchro to digital converter.
FIG. 3 is a schematic diagram of a resistive network circuit used to obtain voltage null.

Reference is now made to FIG. 2 wherein the same reference numerals are assigned to similar parts as in FIG. 1. A synchro 5A is connected to the shaft 8 through a geneva mechanism 64 which ratches the synchro in predetermined steps, for example 36° which makes 10 steps for a complete revolution. It is understood that other steps could be utilized. The networks 13 and circuits 14 are similar to those of FIG. 1 hence a detailed description thereof will be omitted.

The circuit 14*a* is connected by conductor 65, logic 66, conductor 67, logic 68 and diode 69 to the 5 flip-flop of the register 16. The circuit 14*b* is connected by conductor 76 to the 4 flip-flop of the register 16. The circuit 14*c* is connected by conductor 71 and diode 72 to the 2 flip-flop of the register 16 and is also connected by conductor 73 and diode 74 to the 1 flip-flop of the register 16. The circuit 14*d* is connected by conductor 75 and diode 76 to the 2 flip-flop of the register 16. The circuit 14*e* is connected by conductor 77 and diode 78 to the 1 flip-flop of the register 16.

A phase sense demodulator 47 has its input connected by conductors 48 to the conductors 15*a* and its output connected by conductor 49 to the input of a Schmitt Trigger 50. The output of the Schmitt Trigger 50 is connected by conductor 79 and diode 80 to the 5 flip-flop of the register 16. A second phase sense demodulator 52 has its input connected by conductors 53 to the conductors 15*d* and its output connected by conductor 81 to a Schmitt Trigger 57. The output of the trigger 57 is connected by conductor 82 to the logic 68.

In the operation, the synchro voltages are passed through the networks 13 which yield output voltages which are null at the predetermined positions. With the synchro zeroed, the voltage X-Y is a signal for the zero position. By providing resistive networks, a signal is obtained indicating proximity to each of the predetermined angles. These signals are passed into the circuits 14 which produce binary "on" or "off" signal outputs. Thus five binary signals are produced, one of which will always indicate a proximity condition to one digit or its 180° opposite digit. The signals for the 1, 2, 3, and 4 or their reciprocals are set directly into the 1, 2 and 4 flip-flops of the output register 16. The phase detector 47 combined with the level sensitive binary circuit 50 produces a signal which indicates whether the synchro position is higher than the digit 5. The transition level is set so that this signal will not exist when the synchro is in the normal proximity to either 0 or 5. This signal is entered into the 5 flip-flop of the register 16 and thus enables the encoding of the digits 6, 7, 8 and 9. Proximity to 0 or 5 is thus far ambiguous and can be determined by the use of the phase detector 50 driven by one by the networks, or voltages XZ or YZ, which will determine whether the proximity is to 0 to 5.

Referring now to FIG. 3 wherein one type of resistive network which may be used is illustrated, a synchro 5 is connected similar to that shown in FIGS. 1 and 2 to a network 13. The network 13 includes a resistor 83 having one end connected by a conductor 84 to one phase of the synchro stator winding 6. The other end of the resistor 83 is connected by conductor 85 to one side of a resistor 86, the other side of which is connected to the negative side of secondary winding 87 of a transformer 88. The winding 87 has a center tap 89 connected to ground. The transformer 88 has a primary winding 90 with one side connected to ground and the other side connected to the output of an amplifier 91. The input of the amplifier 91 is connected by conductor 92 to another phase of the synchro 5. The third phase of the synchro 5 is connected to ground. The output from the network 13 is connected to the conductor 85.

In the operation each of the networks 13 are given values to represent the predetermined angles using the following formulas: (1) $E_o$=cos("−30)−*k*cos("+30)

(2) $$k=\frac{\cos(\theta-30)}{\cos(\theta+30)}$$

Using the above a voltage null can be obtained for any preset angle except 60° and 240°.

It is understood that other resistive networks could be used, for example a resistive network which simulates a locked 360° wound potentiometer. Furthermore more than two synchros may be used as it permits converting to digital form, individually, the first, second and any succeeding synchros in such a system.

While two embodiments of the invention have been illustrated and described, various changes in the form and relative arrangement of the parts, which will now appear to those skilled in the art, may be made without departing from the scope of the invention.

We claim:

1. A synchro to digital converter for measuring rotational movement of a shaft rotatable in continuous predetermined angular increments, said converter comprising a synchro having a rotor winding responsive to the rotational movement of said shaft, the shaft including means for rotating said rotor winding in continuous predetermined equal angular increments, the synchro including a stator winding inductively coupled to the rotor winding, means for energizing one of said windings, means responsive to the output from the other of said inductively coupled windings to produce output voltages having null points representing a proximity condition of the rotor winding to said angular positions and the 180° opposite angular position of said rotor winding, second means responsive to said output voltages to produce a signal indicative of the angular position of said rotor winding, discriminator means responsive to output voltages produced by said first means for producing another signal dependent upon the angular position of said rotor winding relative to the 180° position, and means responsive to said signals produced by said second means and said discriminator means to register said equal angular incremental positions of the rotor winding.

2. The combination as set forth in claim 1 in which said discriminator means includes means for resolving ambiguities to determine the proximity condition of the rotor winding to the 0° or 180° opposite angular position.

3. The combination as set forth in claim 1 in which said first means for producing null output voltages include resistor networks connected between the output from said other inductively coupled winding of the synchro and said second means and said discriminator means, and said resistor networks being equal in number to half the number of the predetermined equal angular increments of rotation of the rotor winding during each revolution thereof.

4. The combination as set forth in claim 1 in which the means for rotating said synchro rotor winding includes a geneva coupling mechanism for positioning said rotor winding in equal angular increments of 36°.

5. The combination as set forth in claim 1 in which said means for rotating said shaft includes coupling means for effecting rotation of the rotor winding of the synchro to 10 discrete predetermined angular positions for each complete revolution of the rotor winding and in angular increments of 36°, and said register means includes a 1-2-4-5 flip-flop to register the 10 discrete angular positions of the rotor winding of the synchro effected by said coupling means.

6. The combination as set forth in claim 5 in which the output from said register means is connected to an indicator for the discrete angular positions of the rotor winding of the synchro.

7. The combination as set forth in claim 1 in which said second means for producing the signal indicative of the angular position of said rotor winding includes binary "on" or "off" circuits.

8. The combination as set forth in claim 7 in which the threshold of said binary circuits are set at 50 percent to 100 percent, and said discriminator means includes logic means connected between said binary circuits and said register means to discriminate between two "on" signals of the binary circuits.

9. The combination as set forth in claim 7 in which said discriminator means includes other logic means to encode the angular position of the rotor winding in proximity to the 180° opposite angular position.

10. The combination as set forth in claim 1 in which the means for rotating said shaft includes coupling means for effecting rotation of said rotor winding in angular increments of 36°.

11. A synchro to digital converter for measuring rotational movement of a rotatable shaft, said converter comprising a synchro having inductively coupled stator and rotor windings, the rotor winding being responsive to the rotational movement of the shaft, said shaft including means for angularly positioning said rotor winding in continuous predetermined angular increments of 36° relative to the stator winding, one of said windings being energized by an alternating current voltage, and the other of said windings providing signals corresponding to the angular incremental position of the rotor winding relative to the stator winding; means responsive to the signals from said other winding of the synchro including a plurality of circuits for detecting the amplitude of the signals and each circuit being arranged to selectively provide a predetermined voltage corresponding to a predetermined incremental angular position of the rotor winding relative to the stator winding and to a corresponding opposite position of the rotor winding relative to said stator winding of the synchro, and means connected to the voltage means for detecting the predetermined voltages and providing digital signals corresponding to the incremental angular position of the rotor winding, a first phase sensitive demodulator connected to the predetermined voltage selectively provided by one of the circuits of said voltage means, a second phase sensitive demodulator connected to the predetermined voltage selectively provided by another of the circuits of said voltage means, and trigger means operable by outputs of said first and second phase sensitive demodulators to provide the angular incremental rotor winding position signals for distinguishing between an incremental angular position of the rotor winding and it corresponding opposite angular position, and means responsive to said digital and rotor winding position signals for registering the incremental angular position of the rotor winding of the synchro.

12. The combination defined by claim 11 in which said trigger means includes a first trigger device operable by the output from said first phase sensitive demodulator, a second trigger device, and logic elements operable by outputs of said first and second phase sensitive demodulators to control the second trigger device so that said first and second trigger devices of said trigger means may provide the rotor winding position signals for distinguishing between the incremental angular position of the rotor winding and its corresponding opposite angular position.

13. The combination defined by claim 11 in which said trigger means includes a first trigger device operable by the output from said first phase sensitive demodulator, a second trigger device operable by the output from said second phase sensitive demodulator, and logic elements operable by an output from said second trigger device and an output signal from the voltage detecting means so that said first and second trigger devices of said trigger means may provide the rotor position signals for distinguishing between the incremental angular position of the rotor winding and its corresponding opposite angular position.

14. The combination defined by claim 11 in which said trigger means includes first and second level sensitive binary circuits, logic elements, and means operably connecting said binary circuits and logic elements between the outputs of said first and second phase sensitive demodulators and said voltage detecting means in such a manner that said trigger means may provide the rotor winding position signals for distinguishing between the incremental angular position of the rotor winding and its corresponding opposite angular position to the registering means responsive to the digital and rotor winding position signals.